United States Patent [19]
Pollock

[11] Patent Number: 5,193,793
[45] Date of Patent: Mar. 16, 1993

[54] RE-USABLE COMBINATION MIXING BOARD AND CARRYING APPARATUS

[76] Inventor: Thomas R. Pollock, 41335 SE. Coalman Rd., Sandy, Oreg. 97055

[21] Appl. No.: 860,956

[22] Filed: Mar. 31, 1992

[51] Int. Cl.⁵ .............................................. B23Q 3/00
[52] U.S. Cl. .............................. 269/302.1; 16/111 R; 269/309
[58] Field of Search .............. 269/289 R, 302.1, 309, 269/329, 901; 16/110 R, 111 R, 114 R, 115

[56] References Cited

U.S. PATENT DOCUMENTS

| | | | |
|---|---|---|---|
| 1,105,531 | 7/1914 | Pfleiderer | 269/309 |
| 1,212,040 | 1/1917 | Fletcher | 269/302.1 |
| 2,868,145 | 1/1959 | Brooke | 269/302.1 |
| 3,222,732 | 12/1965 | Miller | 16/111 R |
| 3,912,249 | 10/1975 | Vaca | 269/289 R |
| 4,081,169 | 3/1978 | Lauter | 269/302.1 |

Primary Examiner—J. J. Swann
Attorney, Agent, or Firm—Olson & Olson

[57] ABSTRACT

A combination mixing board and carrier apparatus utilizes an enlarged base member configured to be supported securely on an underlying surface, the base member centrally mounting a vertically upstanding peg member configured to releasably receive a downwardly extending handle member secured centrally to the underside of an enlarged mixing platform, the mixing platform mounting on its upper surface a pad having a multiplicity of plastic sheets each having a backing of pressure sensitive adhesive binding them together releasably so that after the uppermost sheet has been used and soiled, it may be easily peeled off and discarded, immediately exposing a fresh, clean mixing surface. Once a compound has been mixed on the mixing platform, the handle member is grasped and the upper portion of the assembly is lifted, leaving its base remaining on the underlying surface, and the apparatus then provides a convenient carrying platform for the compound as it is used, thereby eliminating the need for transferring the mixed compound to a separate carrier and the corresponding time and labor involved in cleaning it after a use as well.

7 Claims, 1 Drawing Sheet

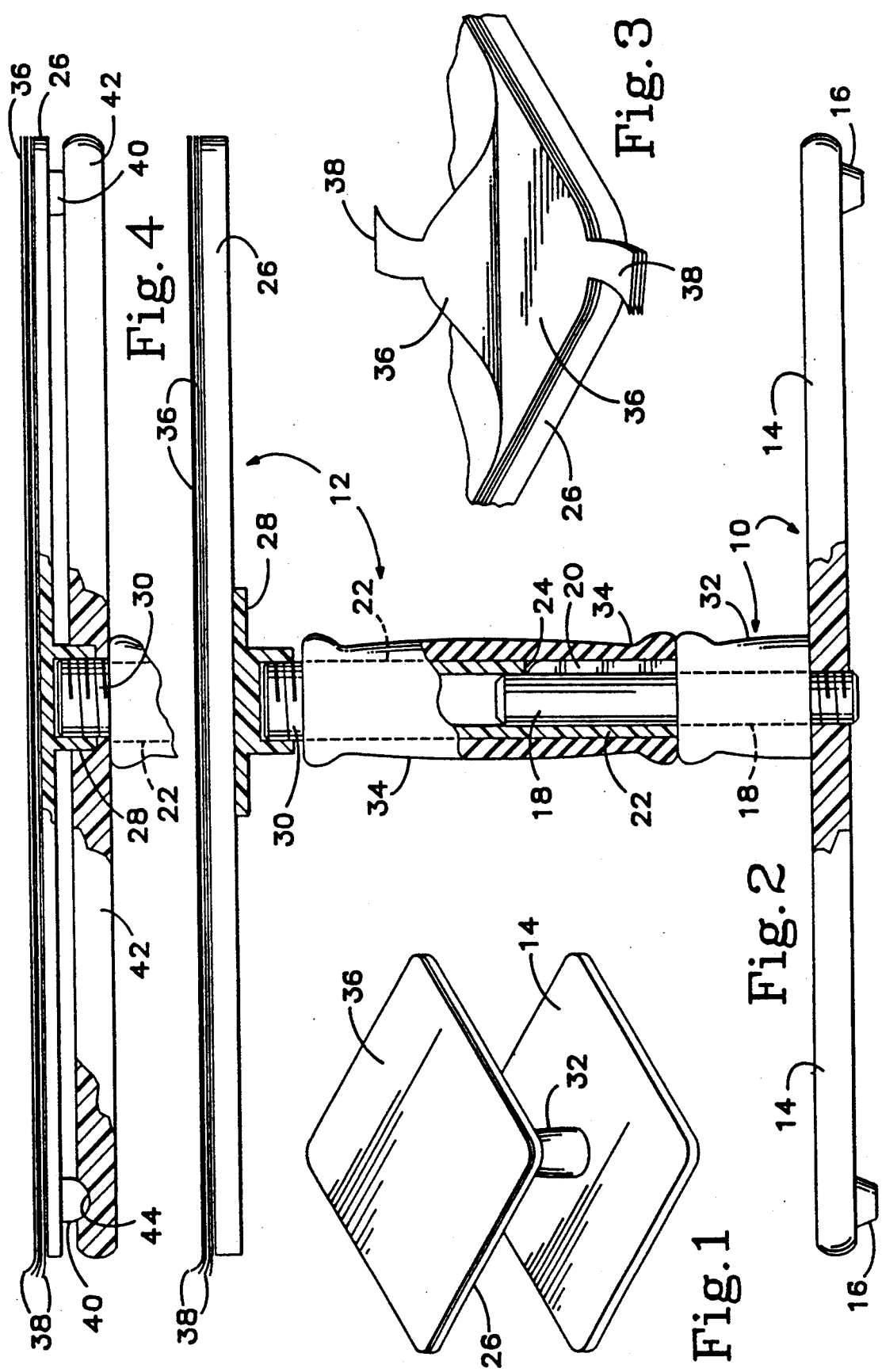

RE-USABLE COMBINATION MIXING BOARD AND CARRYING APPARATUS

BACKGROUND OF THE PRIOR ART

This invention relates primarily to mixing boards for the mixing of compounds such as plastic filler material and bumper repair material commonly used in auto body repairs; spackling paste, joint compound, plaster, mortar and the like used in general construction; paints, sculpting materials and the like used in artists' work, and more particularly to a novel mixing board apparatus that provides a stable base upon which to mix a compound while also providing a conveniently portable base platform for conveniently carrying and holding the mixed compound as it is used, the mixing board further providing an instantly renewable surface which completely eliminates the time and effort of cleaning between uses.

Mixing boards of the type which utilize replaceable or easy to clean mixing surfaces have been provided heretofore as illustrated in U.S. Pat. Nos. 1,137,482; 1,952,375; 2,369,898; and 3,734,486. The first patent above discloses an amalgam mixing board configured to address the problem of mercurial poisoning of a dental technician and oxidation contamination of the amalgam during its amalgamation process. Since its use in dental offices involves the mixing of very small amounts of materials immediately adjacent the patient where the amalgam is to be used, the reference construction is structurally inappropriate for the uses described above, in which materials are used in sizeable quantities, are themselves considerably heavy and bulky, and must be carried to car bodies, walls, etc., and held constantly during their application.

The remaining three references, all disclosing stationary mixing boards, provide mechanical structure to accommodate the renewing of the mixing surface. However, in all cases the mixing board surface is not separable from the base surface and configured for portability of the mixed product as it remains on the mixing board surface. Accordingly, the compounds, once mixed, must be removed from the mixing board and placed on a carrier which is then taken to the site where the compound is to be applied. Although the mixing board apparatus disclosed in the references employ renewable surfaces, to eliminate the necessity of cleaning, they all require a separate, undisclosed carrying device which itself must be cleaned between each use. Accordingly, there is a need experienced in the art which provides a renewable surface mixing board apparatus which avoids the complicated and weight-adding mechanics involved in previous devices and further avoids the requirement of a separate carrier for the mixed compound as it is used.

SUMMARY OF THE INVENTION

In its basic concept, this invention provides a mixing board apparatus having a base member configured for disposition on an underlying surface, the base member mounting an upstanding peg member which releasably engages a downwardly extending handle member secured centrally to the underside of a rigid mixing board, whereby a compound can be mixed on the mixing board surface secured by the base member, and then the mixing board may be lifted off of the underlying base and carried conveniently in one hand while the operator applies the compound with the other hand.

It is by virtue of the foregoing basic concept that the principle objective of this invention is achieved; namely, the provision of a mixing board apparatus that provides a secure and stable mixing platform for compounds and the like which is quickly and conveniently separable from its supporting base in order to provide a carrier for the mixed compound during its application and use.

Another object of this invention is the provision of a mixing board apparatus of the class described which provides a renewable mixing surface which avoids the significant structural and mechanical complexities of similar renewable surface mixing boards of the prior art.

Another object of this invention is the provision of a mixing board of the apparatus of the class described in which the portable mixing board platform may include an underlying strengthening panel member configured to more securely support the periphery of the mixing board platform in applications where such additional strength and rigidity would be advisable, as in the case of unusually heavy compounds such as mortar and the like.

A still further object of this invention is the provision of a mixing board and carrying apparatus of the class described which is of simplified construction for economical manufacture and reduced weight for ease in operation.

The foregoing and other objects and advantages of this invention will appear from the following detailed description, taken in connection with the accompanying drawings of a preferred embodiment.

BRIEF DESCRIPTION OF THE DRAWINGS

FIG. 1 is a perspective view of a mixing board apparatus embodying the features of this invention.

FIG. 2 is a side elevation of the mixing board apparatus shown in FIG. 1, parts being broken away to show internal detail.

FIG. 3 is a fragmentary perspective view of a corner portion of the mixing table having a plurality of plastic sheets attached together by a pressure-sensitive adhesive backing on each sheet and showing finger tabs on each sheet to facilitate their individual removal after a compound has been mixed thereon and used.

FIG. 4 is a side elevation of another embodiment of the portable mixing table shown in FIG. 2, a reinforcing panel being provided to strengthen the mixing table for use with unusually heavy and bulky compounds.

DESCRIPTION OF THE PREFERRED EMBODIMENT

The features of the present invention which now will be described are seen in the drawings FIGS. 1-3. FIGS. 1 and 2 of the drawings illustrate the mixing board apparatus of this invention in condition for receiving a compound to be mixed preliminary to separation of the portable upper section of the apparatus from its lower, base section in order to carry the material to the site at which it is to be used. As seen best in FIG. 2 of the drawings, the mixing board apparatus of this invention comprises two main sections: A lower, base stand section 10 and a removable upper mixing and carrying section 12.

Referring first to the lower section 10, an enlarged base member 14 is configured for stable and secure support on an underlying base such as a counter, a table, a floor etc. Means is preferably provided to secure the base more positively on the underlying surface against slipping and inadvertent movement. In the embodiment illustrated, the underside of the base member 14 is provided with stabilizing feet 16, although it is to be understood that other suitable means may alternatively be provided, including the provision of clamps, screws or the like to secure the base immovably in place, should such be desired.

As illustrated in FIG. 2 of the drawings, the base member 14 centrally mounts an upstanding peg or support member, rod 18, fixedly for vertical extension from the center of the base member. The rod may be secured in place to the base member in any conventional manner such as by its being screwed into a threaded bore through the base member, as shown. As shown in the preferred embodiment, the upstanding rod 18 is provided with a key 20 which projects outwardly from its side surface, the purpose of which will be explained later.

With reference now to the removable upper portion 12 of the mixing board apparatus of this invention, a longitudinally elongated hollow tube 22 is provided with an open interior diameter slightly larger than the outside diameter of the upstanding rod 18. Thus, the tube may be freely received on the rod but with a minimum tolerance therebetween. In this manner, any wobble of the tube on the rod is prevented, yet at the same time unrestricted vertical movement of the tube relative to the rod is permitted. The tube is provided with a slot or keyway 24 configured to align with the key 20 on the rod 18 and thereby prevent any rotational displacement of the tube on the rod. Accordingly, it is seen that the tube is received by and supported on the rod for free vertical movement, while means is provided to prevent undesirable wobbling and rotational movement of the tube relative to its upstanding support rod.

The upper end of the tube is mounted by suitable means to an enlarged, rigid mixing platform 26. In the embodiment illustrated, a threaded fitting 28 is bonded or otherwise secured centrally to the underside of the mixing platform 26, and the outer surface of the tube 22 is provided with corresponding threads 30 by which the tube and the platform are secured together. Alternatively, the tube may be bonded, welded or otherwise permanently and fixedly attached to the underside of the mixing platform as desired.

In the embodiment illustrated, an enlarged handle member 32 is provided on the lower portions of the rod 18. This handle member, aside from providing a convenient hand grip, serves the additional function of providing an enlarged base arranged to provide an abutment which supports the tube 22 when it is disposed on the rod. An elongated carrying handle member 34, preferably of resilient foam-type material that affords a positive grip is preferably secured to the tube member 22 between its lower terminal end and its mount at its opposite end to the mixing platform 26. The handle members 32, 34 are preferably bonded to the outside surface of their respective rod 18 and tube 22 to prevent any chance of their separation during lifting and carrying of the apparatus.

As is illustrated, the mixing platform 26 preferably mounts a multiplicty of stacked plastic sheets 36 each having a pressure sensitive adhesive backing releasably bonding them together in the form of an enlarged pad. A non-adhesive backed finger tab 38 is preferably provided each plastic sheet at one of its corners to facilitate separation of the uppermost remaining sheet independently of the others in the pad.

As will be apparent to those skilled in the art, the mixing board apparatus of this invention when disposed on an underlying surface receives a load of material on the uppermost plastic sheet 36, and provides a solid and secure platform for the material during the mixing operation. Once the compound is satisfactorily mixed, the user simply grasps the padded carrying handle member 34 and lifts the upper portion 12 vertically off of its supporting lower portion 10, and carries the assembly to the job site. The compound is then used as it is intended. When application of the compound is completed, the user simply peels off the uppermost plastic sheet over a waste receptacle and discards the former, returning the upper portion of the mixing assembly of this invention to its base where it is immediately ready for another use.

As will also be apparent to those skilled in the relevant art, the present invention eliminates the heretofore common requirements of having to find a piece of scrap material to use as a mixing board; the time and effort of cleaning the scrap material before mixing the compound so as not to contaminate the latter; the need of finding a separate carrier for the mixed compound as required by mixing boards of the prior art; the need to carefully clean the mixing board and/or carrier surface after a use within a time frame that allows the compound to be cleaned from the surface before it has set and hardened; and equally importantly, it eliminates the risk of contamination of subsequent batches of compound with remnants of dried and hardened compounds overlooked and remaining on the mixing board and carrier. The time and labor saving features of this invention are immediately noticeable.

It is to be understood that once an entire pad of plastic sheets 36 has been used, replacement refill pads would simply be installed on the mixing board panel 26.

With reference to the embodiment of the invention illustrated in FIG. 4 of the drawings, a substantially strengthened version is shown for use in connection with compounds and materials which by nature or amounts result in weights which might require that the mixing platform 26 be provided additional rigidity. In this embodiment, the mixing platform 26 is provided with detent balls 40 adjacent its outer peripheral edge. A substantial and rigid reinforcing panel 42 is interposed between mixing platform 26 and the handle 34 so that it is clamped securely therebetween when the threaded end of the tube 22 is screwed into the threaded mount 28 on the mixing platform, thereby frictionally securing the assembly solidly together. Detents 44 are provided in the upper surface of the reinforcing panel 42 to correspond with the detent balls 40 provided on the mixing platform 26 to prevent any relative rotational movement therebetween when the assembly is cinched tightly together as just previously described. The mixing board apparatus of FIG. 4 may be provided as a separate, complete construction to the marketplace, or alternatively the reinforcing board may be provided for optional use as required in connection with the basic embodiment of the invention illustrated in FIGS. 1-3.

From the foregoing it will be apparent to those skilled in the art that various changes other than those already described may be made in the size, shape, type, number and arrangement of parts described hereinbefore without departing from the spirit of this invention and the scope of the appended claims.

Having thus described my invention and the manner in which it is used, I claim:

1. A reusable, combination mixing board and carrying apparatus comprising:
   a) a base member configured for stable support on an underlying surface,
   b) an upstanding support member mounted on the base member and configured to extend vertically upward a spaced distance therefrom,
   c) a rigid mixing platform configured to support a quantity of material thereon, and
   d) a vertically extending carrying handle member secured to the mixing platform and configured to extend downwardly therefrom, the carrying handle member including releasable mounting means configured to engage said upstanding support member to releasably secure said mixing platform-supporting carrying handle member against movement on said base member.

2. The combination mixing board and carrying apparatus of claim including at least one plastic sheet adhered removably to the mixing platform overlying the mixing surface thereof, said plastic sheet being easily removable for discard when soiled.

3. The combination mixing board and carrying apparatus of claim 2 wherein said plastic sheets are provided in the form of a pad containing a multiplicity of individual sheets, each sheet having a pressure sensitive adhesive backing securing the multiplicity of sheets together for individual removal of the uppermost sheet of the pad after it has been soiled.

4. The combination mixing board and carrying apparatus of claim 1 wherein said upstanding support member comprises a peg member and said downwardly extending handle member includes a hollow interior portion configured to correspond with the outer configuration of the peg member in close tolerance therewith, the peg member being received within the handle member to support the latter against rotational and wobbling movement when the handle is seated on the peg member.

5. The combination mixing board and carrying apparatus of claim 4 including at least one plastic sheet adhered removably to the mixing platform overlying the mixing surface thereof, said plastic sheet being easily removable for discard when soiled.

6. The combination mixing board and carrying apparatus of claim 1 including rigid, reinforcing panel support means interposed between and engaging said carrying handle member and said mixing platform, said reinforcing panel member configured to support the underside of the mixing panel adjacent its outer peripheral edge.

7. The combination mixing board and carrying apparatus of claim 1 wherein said upstanding support member comprises a rod mounted centrally on the base member for vertical extension therefrom, the rod including a longitudinally extending key projecting outwardly from the surface thereof, and the downwardly extending carrying handle member comprises a longitudinally elongated, hollow tube member and a keyway slot configured to receive the rod and key in close tolerance therewith to permit a free vertical movement therebetween and prevent rotational or wobbling movement therebetween, the upper end of the tube member being threaded for removable connection to a threaded fitting secured fixedly to the underside of said rigid mixing platform substantially at the center point of the latter, and at least one plastic sheet secured removably to the mixing platform overlying the mixing surface thereof, said plastic sheet being easily removable for discard when soiled.

* * * * *